No. 861,432. PATENTED JULY 30, 1907.
L. BURG.
AXLE BOX.
APPLICATION FILED JUNE 28, 1906.
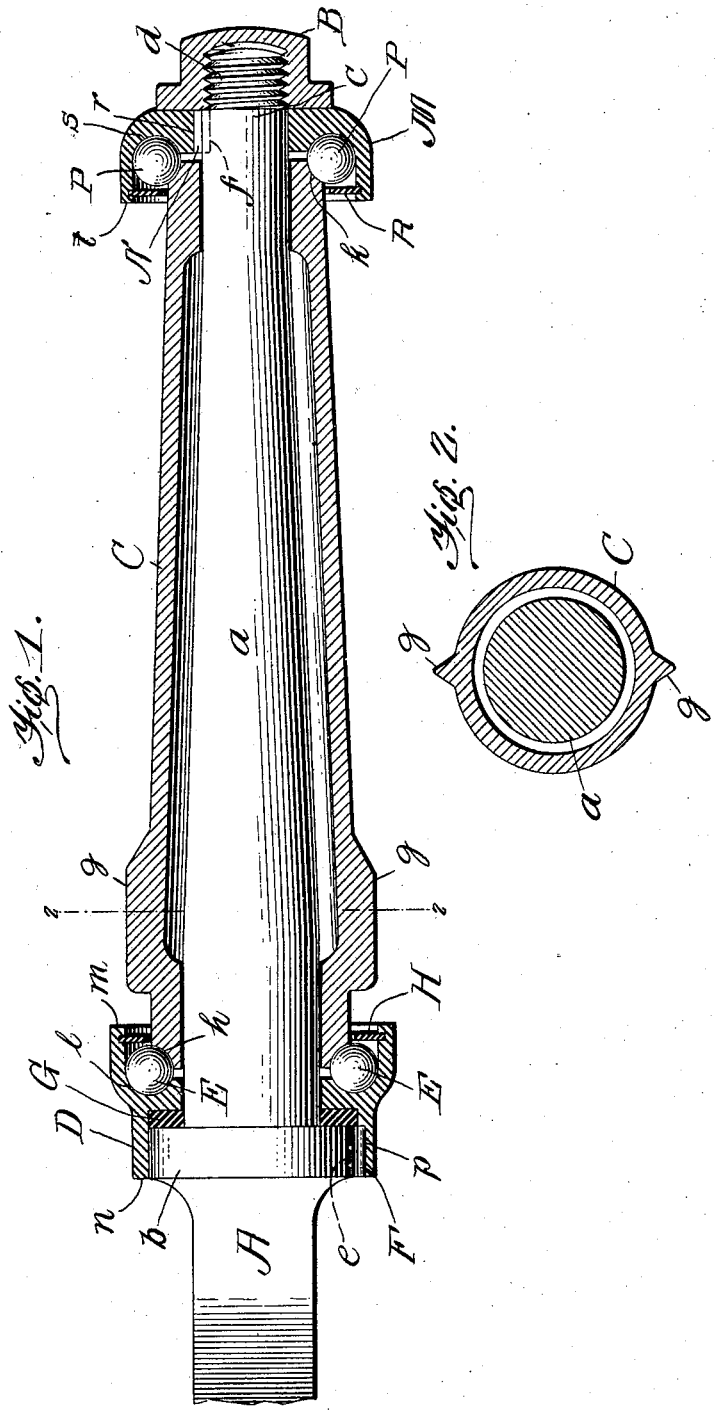
Witnesses
O. W. Holmes
N. C. Healy
Inventor
Louis Burg
By James J. Sheehy
Attorney

UNITED STATES PATENT OFFICE.

LOUIS BURG, OF DALLAS CITY, ILLINOIS.

AXLE-BOX.

No. 861,432.     Specification of Letters Patent.     Patented July 30, 1907.

Application filed June 28, 1906. Serial No. 323,919.

*To all whom it may concern:*

Be it known that I, LOUIS BURG, a citizen of the United States, residing at Dallas City, in the county of Henderson and State of Illinois, have invented new and useful Improvements in Axle-Boxes, of which the following is a specification.

My invention pertains to axle-boxes, more particularly axle-boxes of the ball-bearing type; and it contemplates the provision of an inexpensive and practical axle-box of such construction that the axle is subjected to but a minimum amount of friction, and there is no liability of the wheel being casually locked to the axle.

Other advantageous features peculiar to my invention will be fully understood from the following description and claim when the same are read in connection with the accompanying drawings, forming part of this specification, in which:

Figure 1 is a view partly in elevation and partly in longitudinal section of an axle-box constituting one embodiment of my invention. Fig. 2 is a transverse section taken in the plane indicated by the line 2—2 of Fig. 1.

Referring by letter to the drawings: A is an axle having a spindle $a$ and also having a collar $b$ at the inner end of the spindle and a reduced portion $c$ at the outer end of the spindle; the outer part of the said reduced portion $c$ being threaded as indicated by $d$ to receive a nut B. In the axle A or rather in the perimeter of the axle collar $b$ is provided a longitudinal key-seat $e$ while in the inner smooth part of the end portion $c$ is provided a longitudinal key-seat $f$.

C is a box mounted on the intermediate portion of the axle spindle $a$ and having the usual fins $g$ for fixing it in the hub of a wheel. At its inner and outer ends the said box C is provided with circular grooves $h$ and $k$ of concave form in cross section designed to serve a purpose presently set forth.

D is an annular cup surrounding the inner portion of the spindle $a$ and having an annular groove $l$ which in combination with the groove $h$ in the box C is designed to form a race for a plurality of anti-friction balls E. The said cup D also has an outwardly extending flange $m$ which extends beyond the balls E and surrounds the inner end of the box C, and an inwardly directed flange $n$ which surrounds the axle collar $b$. In this latter flange $n$ is a longitudinal key-seat $p$ which is designed to be registered with the key-seat $e$ of the axle to receive a longitudinal key F. By virtue of this provision it will be apparent that the cup D is held against rotation on the axle collar $b$ and yet the said cup is permitted to move on and with respect to the axle in the direction of the length thereof for an important purpose presently set forth. Between the cup D and the collar $b$ on the axle is interposed an elastic washer G, of leather or other material suitable to the purpose, designed to cushion the cup D against inward thrust and normally hold the said cup in the position shown relative to the collar $b$.

With a view of retaining the balls E in the cup D as when the box C is removed from the axle I provide the ball retainer H. This ball retainer is in the form of an annular plate of metal or other suitable material, and it is carried by and extends inward from the cup flange $m$. From this it follows that the said retainer H will serve not only to retain the balls E in the cup D when the box C is removed from the axle, but will also serve when the box C is in the position shown as a dust guard—*i. e.*, will lessen the liability of dust finding its way to the balls E and the race in which the same are movable.

M is a cup which surrounds the inner smooth part of the axle portion $c$. This cup M is provided with a longitudinal key-seat $r$ designed when registered with the key-seat $f$ in the axle to receive a longitudinal key N, and hence it will be apparent that the cup M is held against rotation on the axle and yet is susceptible of being moved in the direction of the length thereof. Said cup M also has a groove $s$ opposed to the groove $k$ of box C so as to enable the cup to hold anti-friction balls P; and the cup M is further provided with an inwardly reaching flange $t$. This flange $t$ carries a ball retainer R which is similar in construction and functions to the ball retainer H of the cup D.

By virtue of the construction described in the foregoing it will be seen that in the event of the nut B being turned up too much on the threaded end of the axle spindle, the washer G will serve as a cushion and permit inward movement of the cup M, box C and cup D, together with the parts carried thereby, and in that way will effectually prevent locking of the parts which is an important desideratum. It will also be seen that the elasticity of the washer G and the ability of the cups to move on the axle in the direction of the length thereof will tend to prevent breaking or other injury of the parts in the event of sand, gravel or dirt finding their way into the races in which the anti-friction balls are held and movable.

In addition to the practical advantages ascribed in the foregoing to the novel axle-box, it will be observed that the said axle-box is simple and inexpensive in construction and that it reduces to a minimum the friction imposed on the axle and in that way prolongs the usefulness of the axle for an indefinite period. It will also be observed that in the event of either of the cups or the axle-box C wearing out prematurely, the worn part may be readily removed and as readily replaced with a new part without affecting the utility of the other parts of my improvements.

Having described my invention, what I claim and desire to secure by Letters-Patent is:

The combination of an axle having a spindle and a collar at the inner end of the spindle; the said spindle being threaded at its outer end and being provided adjacent to the thread with a longitudinal key seat, a cup removably arranged on the inner portion of the spindle and having an inwardly directed flange surrounding the collar, and also having means on said flange coöperating with means on the collar for holding the cup against rotation on the spindle while permitting said cup to move endwise of the spindle, an elastic washer surrounding the spindle and arranged within the inwardly directed flange of the cup and interposed between said cup and the collar of the spindle for yieldingly holding the cup against inward movement, a nut mounted on the threaded end of the spindle, a cup arranged on the spindle at the inner side of the nut and having a longitudinal key seat arranged to be registered with that in the spindle, a key removably arranged in said seats and retained in position by the nut, whereby the cup is held against rotation and yet is free to move endwise on the spindle, a box mounted on the spindle and arranged between the cups, anti-friction balls interposed between the inner cup and the inner end of the box, and anti-friction balls interposed between the outer cup and the outer end of the box.

In testimony whereof I have hereunto set my hand in presence of two subscribing witnesses.

LOUIS BURG.

Witnesses:
W. H. BLISS,
CLAUDE J. DOTY.